UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

DEPOLARIZER FOR PRIMARY BATTERIES.

1,415,860.     Specification of Letters Patent.     Patented May 16, 1922.

No Drawing.     Application filed August 22, 1918. Serial No. 251,030.

*To all whom it may concern:*

Be it known that we, RAYMOND C. BENNER and HARRY F. FRENCH, citizens of the United States, and residents, respectively, of Fremont, in the county of Sandusky and State of Ohio, have invented a certain new and useful Improvement in Depolarizers for Primary Batteries, of which the following is a full, clear, and exact description.

This invention relates to depolarizers for electric batteries employing an alkaline electrolyte with a positive electrode of zinc.

In primary batteries of the type referred to it has been the custom to use copper oxide (CuO) as the depolarizing material, and it is the usual practice to heat commercial copper oxide scale in the presence of oxygen to convert any cuprous oxide ($Cu_2O$) over into the higher oxide.

We have found that if sulphur or sulphides be mixed with cuprous oxide and used as a depolarizer, the voltage is increased to a value considerably greater than that produced by the cupric oxide mixed with sulphur, as disclosed in the application of R. W. Erwin filed Nov. 30, 1915, Serial No. 64,342. In other words, the effect of sulphur on cuprous oxide is much greater than its effect on cupric oxide.

There is no specific amount of sulphur that should be added to the cuprous oxide to produce the desired result, but we have found that 1% sulphur is a good proportion.

Since the available oxygen in cuprous oxide per gram of copper is only half that of cupric oxide, the service life of a cell made up entirely of cuprous oxide would not be sufficient to render it suitable for certain purposes such as railway signal work. However, advantage can be taken of the high voltage of the cuprous oxide and sulphur, by mixing it with cupric oxide. There is no specific combination of the two oxides that is essential, as the proportion will depend entirely upon the purpose for which the cell is to be used. If a high voltage is the desideratum, the depolarizer should consist largely or entirely of $Cu_2O$ and sulphur; while greater amounts of cupric oxide should be used when greater service life is desired.

To give an idea of the relative values of cuprous and cupric oxides with and without sulphur, the following table is given:

| Sulphur. | CuO. | $Cu_2O$. | Volts. |
|---|---|---|---|
| 0 | 0 | 100 | .640 |
| 1% | 0 | 99% | .800 |
| 0 | 100% | 0 | .640 |
| 1% | 99% | 0 | .690 |

The values given in the above table are averages from standard tests with one ampere continuous drain until the voltage of the cell drops to 0.5 volts.

It is not necessary to use elemental sulphur in the mixtures to produce the desired results, as the various sulphides set forth in our application filed January 26, 1917, Serial No. 144,618, can be used.

Having described our invention, what we claim is:

1. A depolarizer for alkaline cells containing cuprous oxide mixed with sulphur each of said ingredients being effective, substantially as described.

2. A depolarizer for alkaline cells containing a mixture of cuprous oxide, cupric oxide and sulphur each of said ingredients being effective, substantially as described.

3. In primary batteries, the combination of an alkaline electrolyte, a zinc electrode and a depolarizing electrode, comprising as effective ingredients, cuprous oxide and sulphur in admixture.

4. In primary batteries, the combination of an alkaline electrolyte, a zinc electrode and a depolarizing electrode, comprising as effective ingredients, cuprous oxide, cupric oxide and sulphur in admixture.

In testimony whereof, we hereunto affix our signatures.

RAYMOND C. BENNER.
HARRY F. FRENCH.